(12) United States Patent
Thomas

(10) Patent No.: US 7,287,795 B1
(45) Date of Patent: Oct. 30, 2007

(54) VEHICLE STORAGE STRUCTURE

(75) Inventor: Gregory P. Thomas, Canton, MI (US)

(73) Assignee: Nissan Technical Center North America, Inc., MI (US)

( * ) Notice: Subject to any disclaimer, the term of this patent is extended or adjusted under 35 U.S.C. 154(b) by 41 days.

(21) Appl. No.: 11/407,992

(22) Filed: Apr. 21, 2006

(51) Int. Cl.
  *B60R 27/00* (2006.01)
(52) U.S. Cl. .................. 296/24.34; 296/37.8; 312/297
(58) Field of Classification Search ............... 296/37.8, 296/24.34
  See application file for complete search history.

(56) References Cited

U.S. PATENT DOCUMENTS

| | | | | |
|---|---|---|---|---|
| 2,099,122 A | * | 11/1937 | Kreisler | 132/303 |
| 2,805,910 A | * | 9/1957 | Townsend | 312/297 |
| 3,460,878 A | * | 8/1969 | Appel et al. | 312/297 |
| 3,837,464 A | * | 9/1974 | Baughman et al. | 312/297 |
| D248,567 S | * | 7/1978 | Ward | D24/217 |
| 4,162,024 A | * | 7/1979 | Shanley | 220/350 |
| 4,210,361 A | * | 7/1980 | Marvin et al. | 296/210 |
| D343,641 S | * | 1/1994 | Hafendehl et al. | D19/75 |
| 5,761,750 A | * | 6/1998 | Mazzola et al. | 4/500 |
| 6,116,674 A | * | 9/2000 | Allison et al. | 296/37.8 |
| 6,478,204 B2 | * | 11/2002 | Lange et al. | 224/539 |
| 6,499,785 B2 | | 12/2002 | Eguchi | |
| 6,618,981 B1 | * | 9/2003 | Rodriguez | 43/54.1 |
| 6,672,554 B2 | * | 1/2004 | Fukuo | 248/311.2 |
| 6,883,852 B2 | | 4/2005 | Laskey | |

* cited by examiner

*Primary Examiner*—Kiran B. Patel
(74) *Attorney, Agent, or Firm*—Global IP Counselors, LLP

(57) ABSTRACT

A vehicle storage structure includes parallel tracks having a resiliently deformable lid detent configured and arranged to move between a lid latching orientation and a lid releasing orientation. A lid includes track engaging portions disposed on lateral edges of the lid and extending into the tracks for selective sliding movement along the tracks between a closed position and an open position. The track engaging portions and the deformable lid detents are configured and arranged to normally restrict movement of the lid when in the closed position. The track engaging portions and the deformable lid detents are further configured and arranged to move the deformable lid detents from the lid latching orientation to the lid releasing orientation in response to contact pressure applied to the lid at an area adjacent to the deformable lid detents.

20 Claims, 9 Drawing Sheets

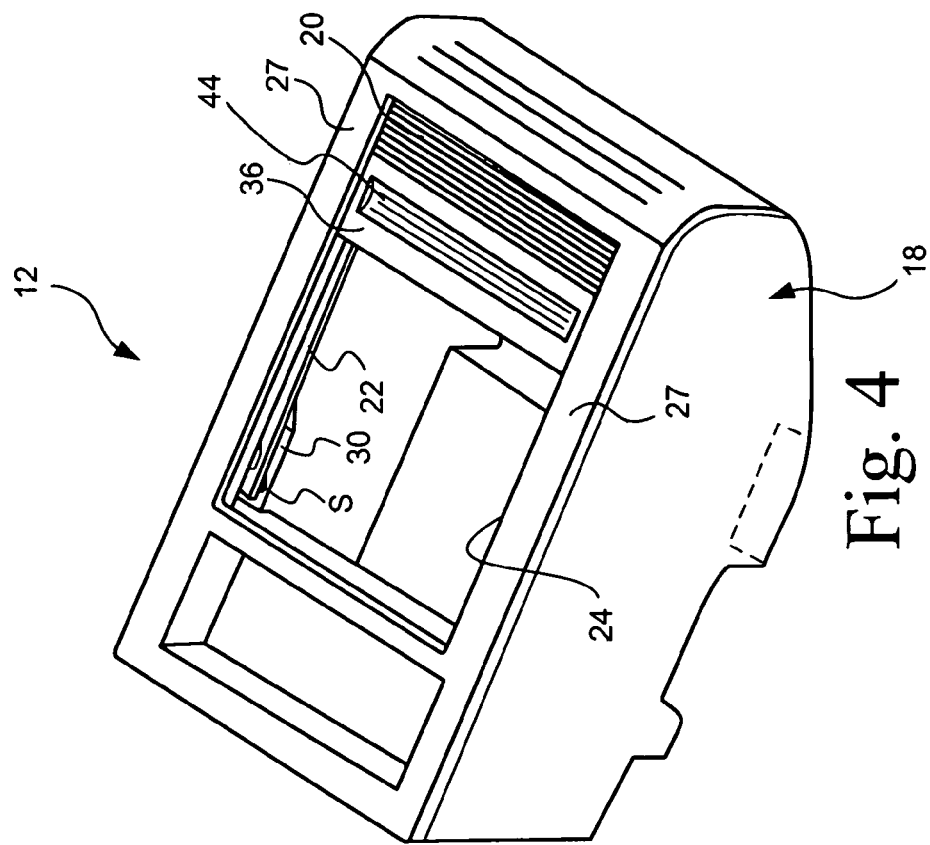
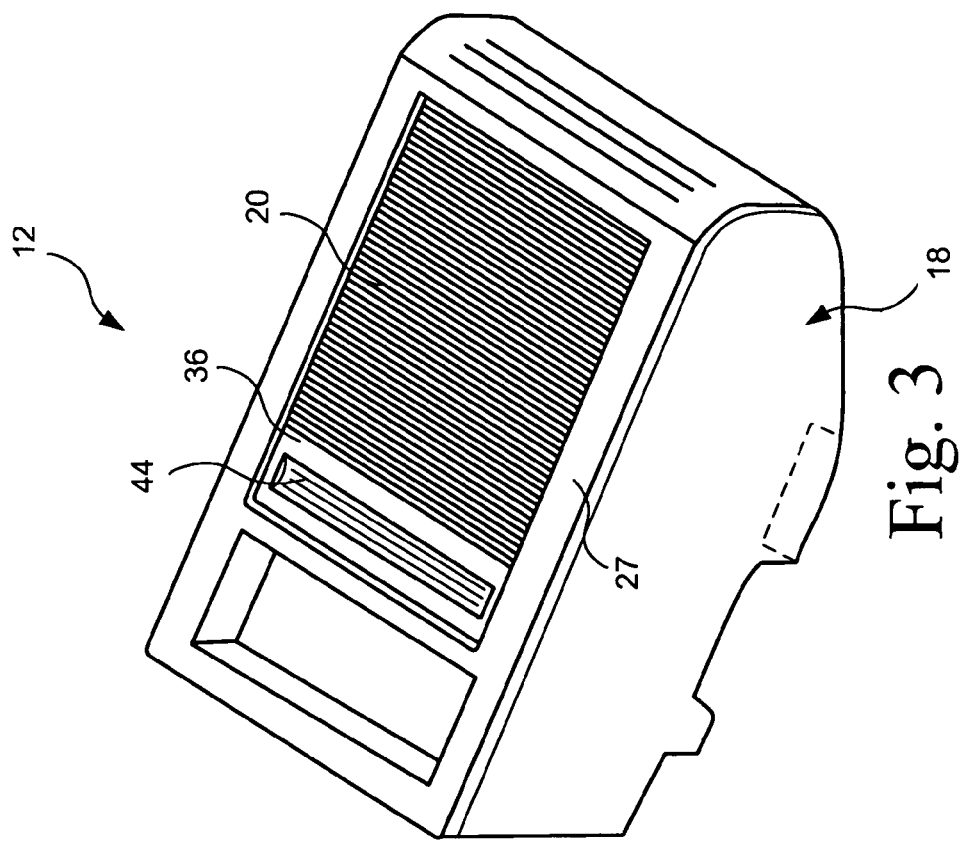
Fig. 4
Fig. 3

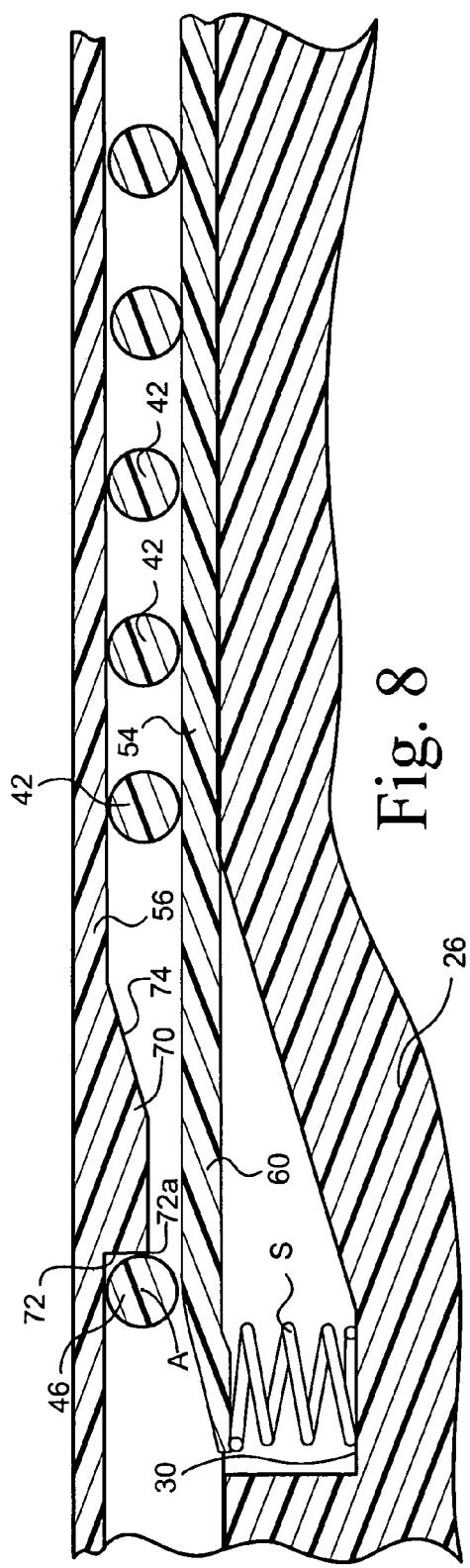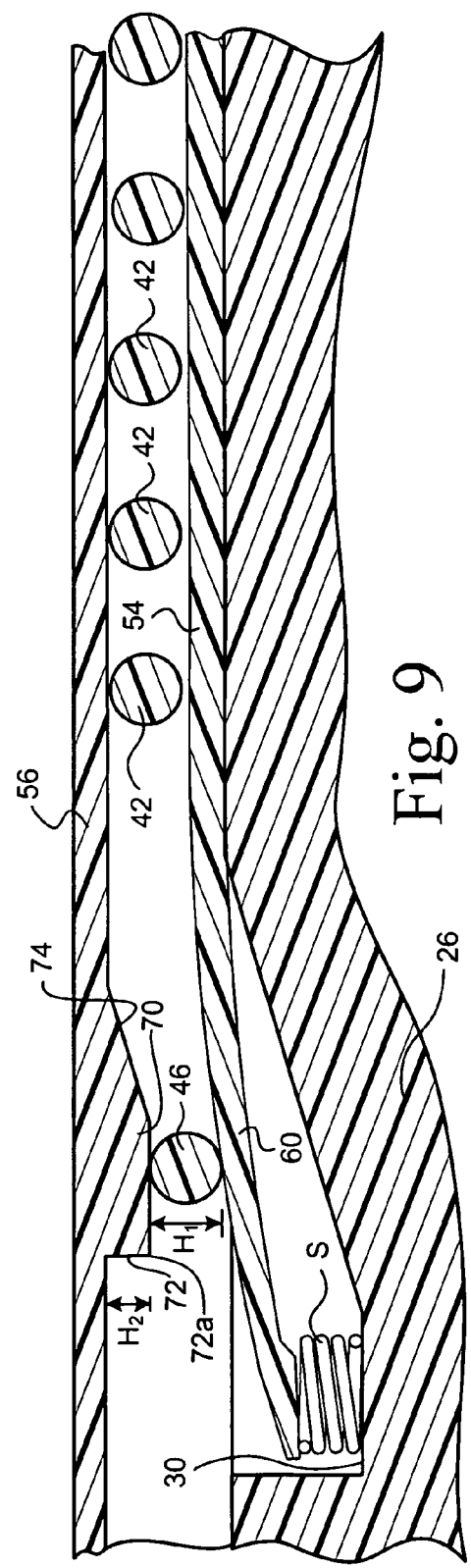
Fig. 8
Fig. 9

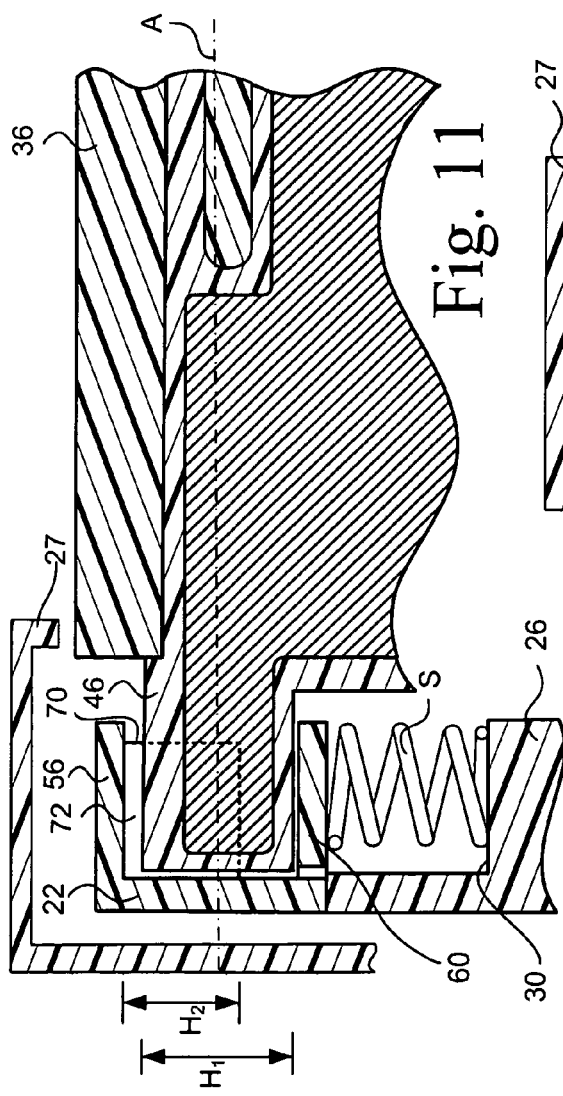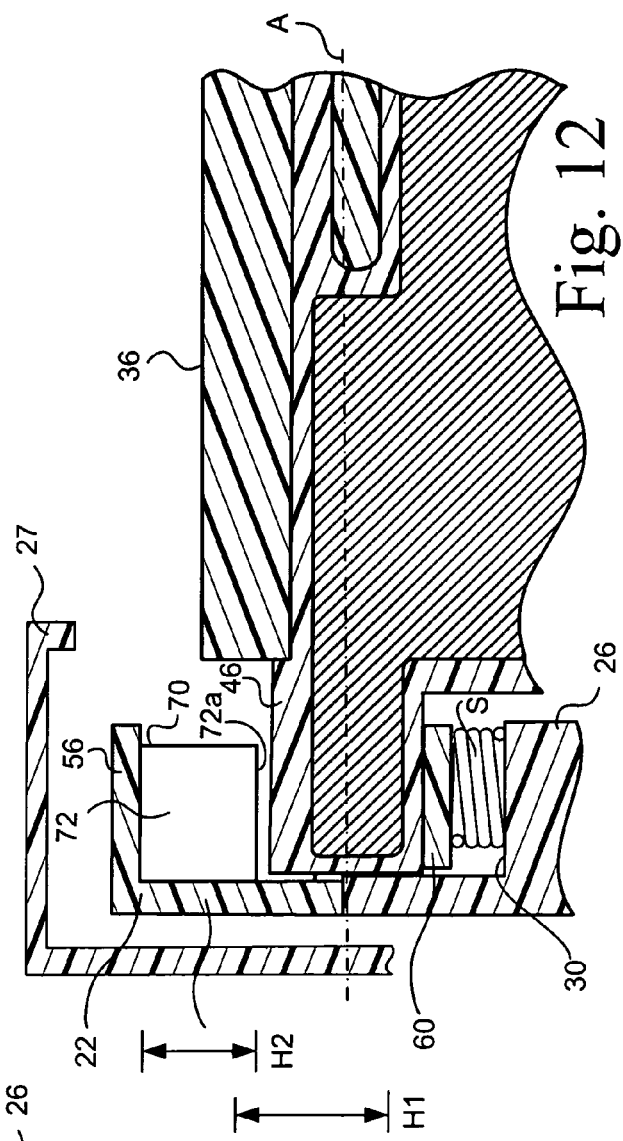

VEHICLE STORAGE STRUCTURE

BACKGROUND OF THE INVENTION

1. Field of the Invention

The present invention generally relates to vehicle storage structure. More specifically, the present invention relates to storage structure that includes a lid with a latching mechanism.

2. Background Information

Vehicles are continually being redesigned and improved for safety and functionality. One area of continuing redesign concerns the storage areas and storage structures within the vehicle. In such storage structures, it is desirable to ensure that the latching mechanism maintains the lid of the storage structure in a closed orientation even during collisions to keep the contents of the storage structure secure. Many interior storage structures include tracks that guide and support a flexible lid that is easily opened by a passenger within the vehicle. Such flexible lid storage structures tend to remain closed even during a collision event. However, when the forces during rear and head-on collisions exceed a prescribed G force, there is concern that such flexible lids might open.

In view of the above, it will be apparent to those skilled in the art from this disclosure that there exists a need for an improved storage structure with a flexible lid that remains closed during a collision. This invention addresses these needs in the art as well as other needs, which will become apparent to those skilled in the art from this disclosure.

SUMMARY OF THE INVENTION

One object of the present invention is to provide a storage structure that includes a lid with a latching structure with sufficient strength to remain closed even upon vehicular impact with large G forces.

Another object of the present invention is to provide a storage structure that includes a lid with a latching mechanism that is simple to operate.

Another object of the present invention is to provide a storage structure that includes a lid with a latching mechanism that is simple to manufacture.

In accordance with one aspect of the present invention, a vehicle storage structure includes a housing portion and a lid. The housing portion includes a pair of generally parallel tracks at least partially defining an access opening with each of the tracks having a resiliently deformable lid detent that is configured and arranged to move between a lid latching orientation and a lid releasing orientation. The lid includes a pair of track engaging portions disposed on lateral edges of the lid. The track engaging portions extend into respective ones of the tracks for selective sliding movement along the tracks between a closed position and an open position. The track engaging portions and the deformable lid detents are configured and arranged to normally restrict movement of the lid when in the closed position. The track engaging portions and the deformable lid detents are further configured and arranged to move the deformable lid detents from the lid latching orientation to the lid releasing orientation in response to contact pressure being applied to the lid in a direction approximately normal to the movement of the lid at an area adjacent to the deformable lid detents such that the lid is free to move along the tracks from the closed position to the open position.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 3 is a perspective view of the storage structure removed from the vehicle showing a flexible lid in a closed position in accordance with an embodiment of the present invention;

FIG. 4 is a perspective view of the storage structure removed from the vehicle showing the flexible lid in an open position in accordance with an embodiment of the present invention;

FIG. 8 is a cross-sectional view taken along the line 8-8 in FIG. 7 showing the track engaging portions and one of the resiliently deformable lid detents with the lid in the closed position and the resiliently deformable lid detent in a lid latching orientation in accordance with an embodiment of the present invention;

FIG. 9 is another cross-sectional view similar to FIG. 8 showing the track engaging portions and one of the resiliently deformable lid detents with a portion of the lid pushed downward urging the resiliently deformable lid detent into a lid releasing orientation in accordance with an embodiment of the present invention;

FIG. 11 is a cross-sectional view taken along the line 11-11 in FIG. 7 showing one of the track engaging portions and one of the resiliently deformable lid detents with the lid in the closed position and the resiliently deformable lid detent in a lid latching orientation in accordance with an embodiment of the present invention; and FIG. 12 is another cross-sectional view similar to FIG. 11 showing the track engaging portion and the resiliently deformable lid detent with a portion of the lid pushed downward urging the resiliently deformable lid detent into a lid releasing orientation in accordance with an embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
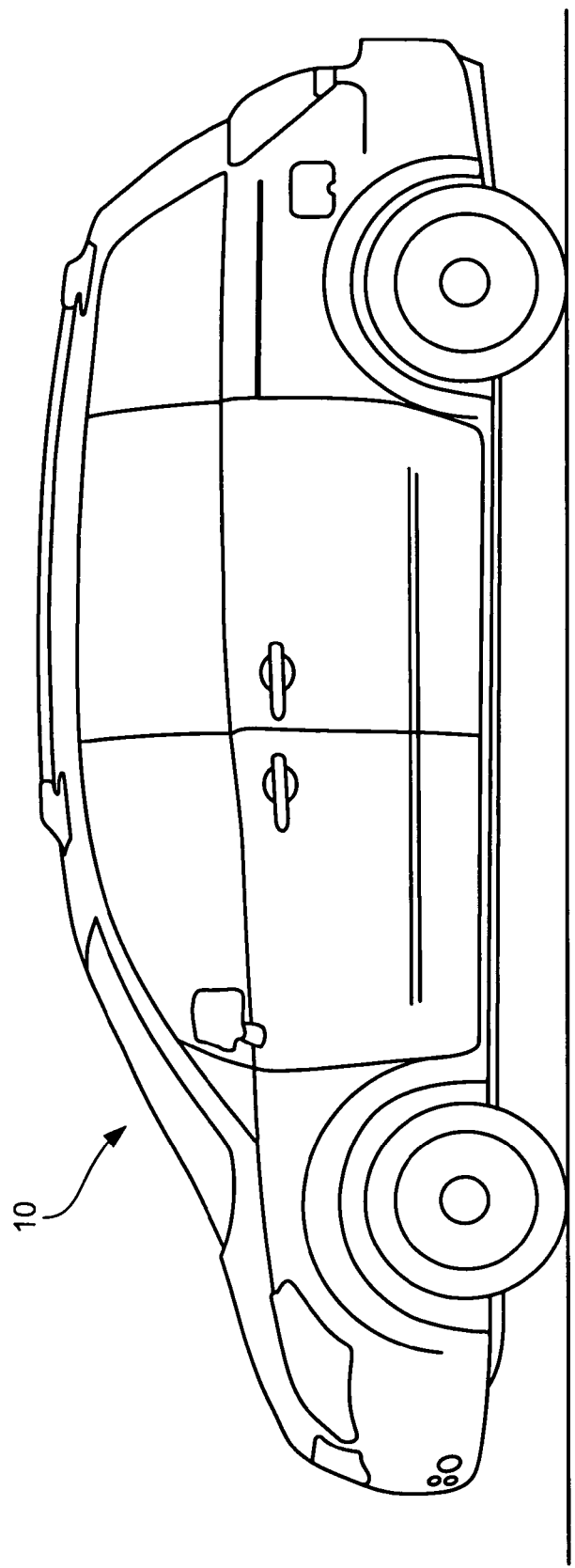
FIG. 1 is a side elevational view of a vehicle in accordance with an embodiment of the present invention.
Figure 2:
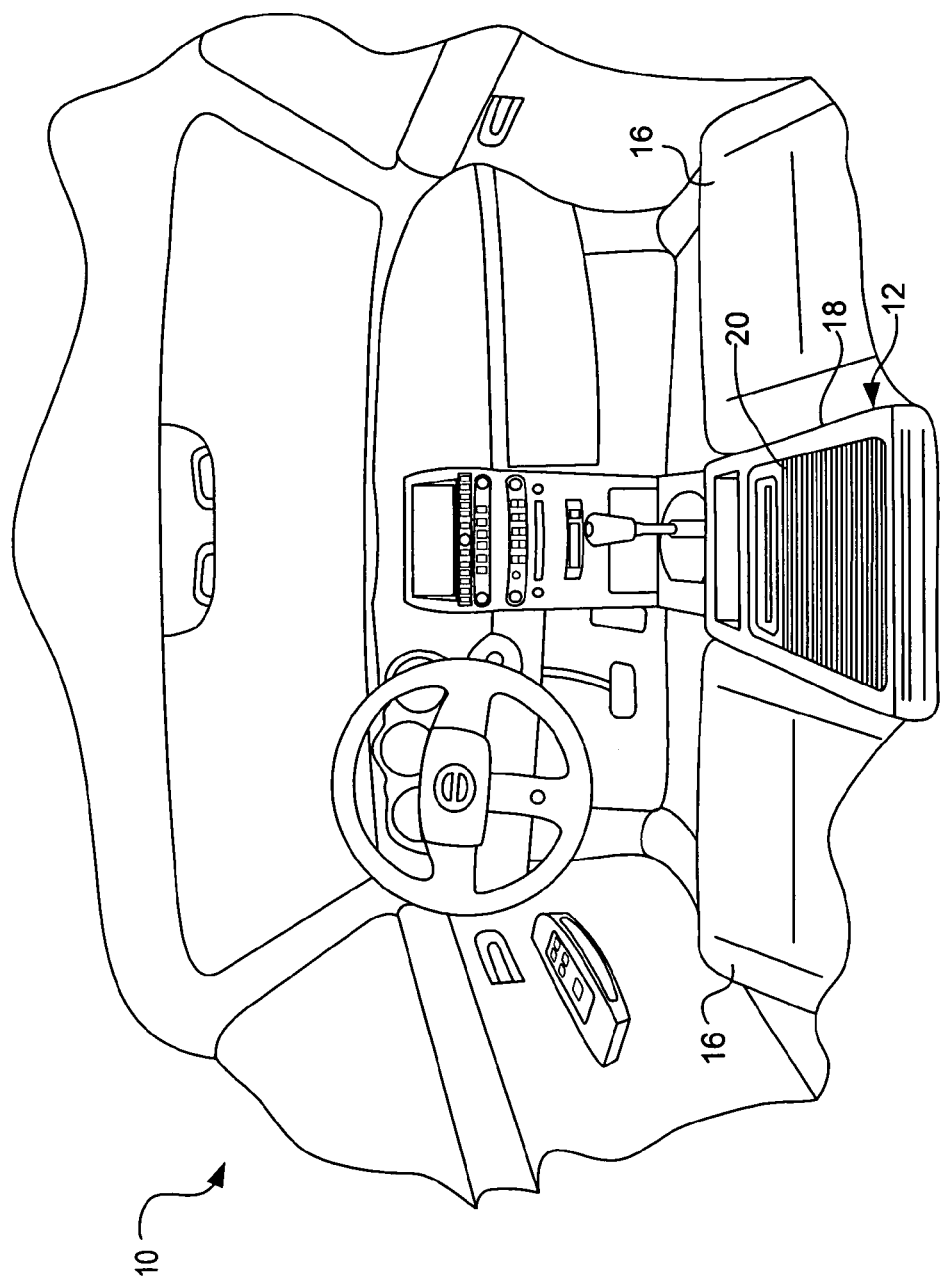
FIG. 2 is a perspective view of the interior of the vehicle depicted in FIG. 1 showing a center console that includes a storage structure in accordance with an embodiment of the present invention.

Referring initially to FIGS. 1 and 2, a vehicle 10 is illustrated that includes a storage structure 12 (shown in FIG. 2) in accordance with a first embodiment of the present invention. In this illustrated embodiment, the storage structure 12 is a center console that is installed between front seats 16 of the vehicle 10. Preferably, the storage structure 12 is designed as a trim component that blends in with the interior features of the vehicle 10. Further, in alternative embodiments, the storage structure 12 can be shaped and arranged for installation in any of a variety of locations within the vehicle 10. For example, the storage structure 12 can also be re-shaped and installed in a dashboard area of the vehicle 10, on the roof within the vehicle 10, beside or between rear seats (not shown) or other rearward locations within the vehicle 10.

As shown in FIGS. 3 and 4, the storage structure 12 includes a housing portion 18, a flexible lid 20 and a pair of tracks 22 (only a portion of one of the tracks 22 is visible in FIG. 4). The housing portion 18 includes an access opening 24 (FIG. 4) that permits access to a concealed storage compartment that is covered by the flexible lid 20 with the flexible lid 20 in a closed position, as shown in FIG. 3. The flexible lid 20 is slidable along the tracks 22 between the closed position (FIG. 3) and an open position (FIG. 4).

Figure 5:
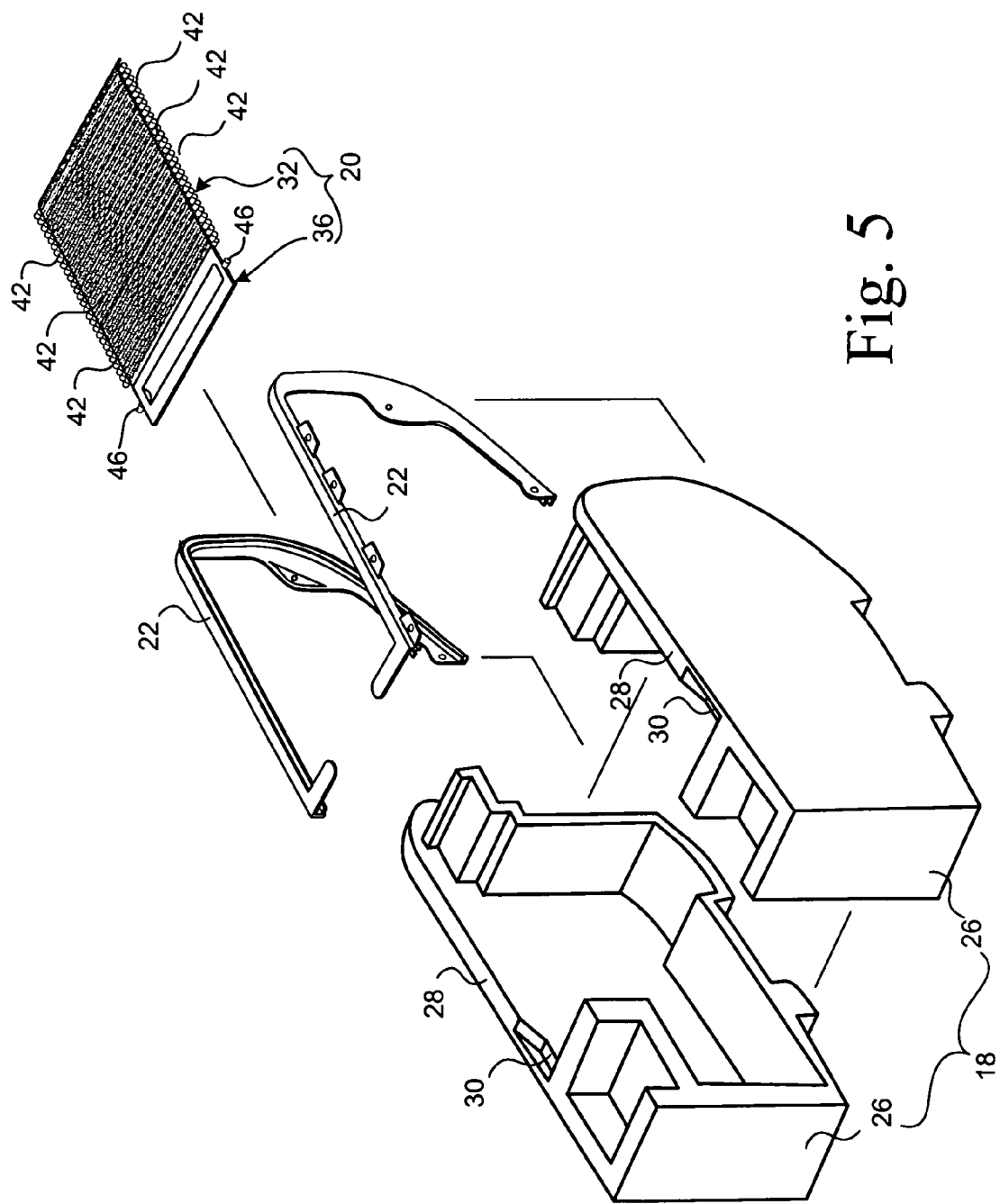
FIG. 5 is an exploded perspective view showing portions of the storage structure includes a pair of tracks and a flexible lid in accordance with an embodiment of the present invention.

The housing portion 18 can be a single pre-formed carcass, can be a series of assembled panels, elements, or, as shown in FIG. 5, can be a pair of shell portions 26 that are generally mirror images of one another. Since description of one of the shell portions 26 applies to both, description of only one of the shell portions 26 is included for the sake of brevity. The shell portions 26 can additionally be provided with, for example, contoured cover panels such as the cover panel 27 shown in FIGS. 3, 4, 11 and 12. The cover panel 27 can be assembled with the housing portion 18 for decorative purposes and also to cover the tracks 22 and edges of the flexible lid 20, as indicated in FIGS. 11 and 12. It should be understood from the drawings and the description herein that the cover panel 27 can be one of a plurality of combination of cover panels and/or coverings applied to the housing portion 18 depending upon location of installation of the storage structure 12 and decorative considerations of the vehicle 10.

As shown in FIG. 5, each shell portion 26 has a track supporting surface 28 that is provided with a recess 30 whose function and purpose is explained in greater detail below with a description of the tracks 22. The track supporting surfaces 28 extend along the outer side of each of one of the shell portions 26. The track supporting surfaces 28 curve down around a backside with a contoured shape that conforms to the shape of the tracks 22, as described in greater detail below.

Figure 7:
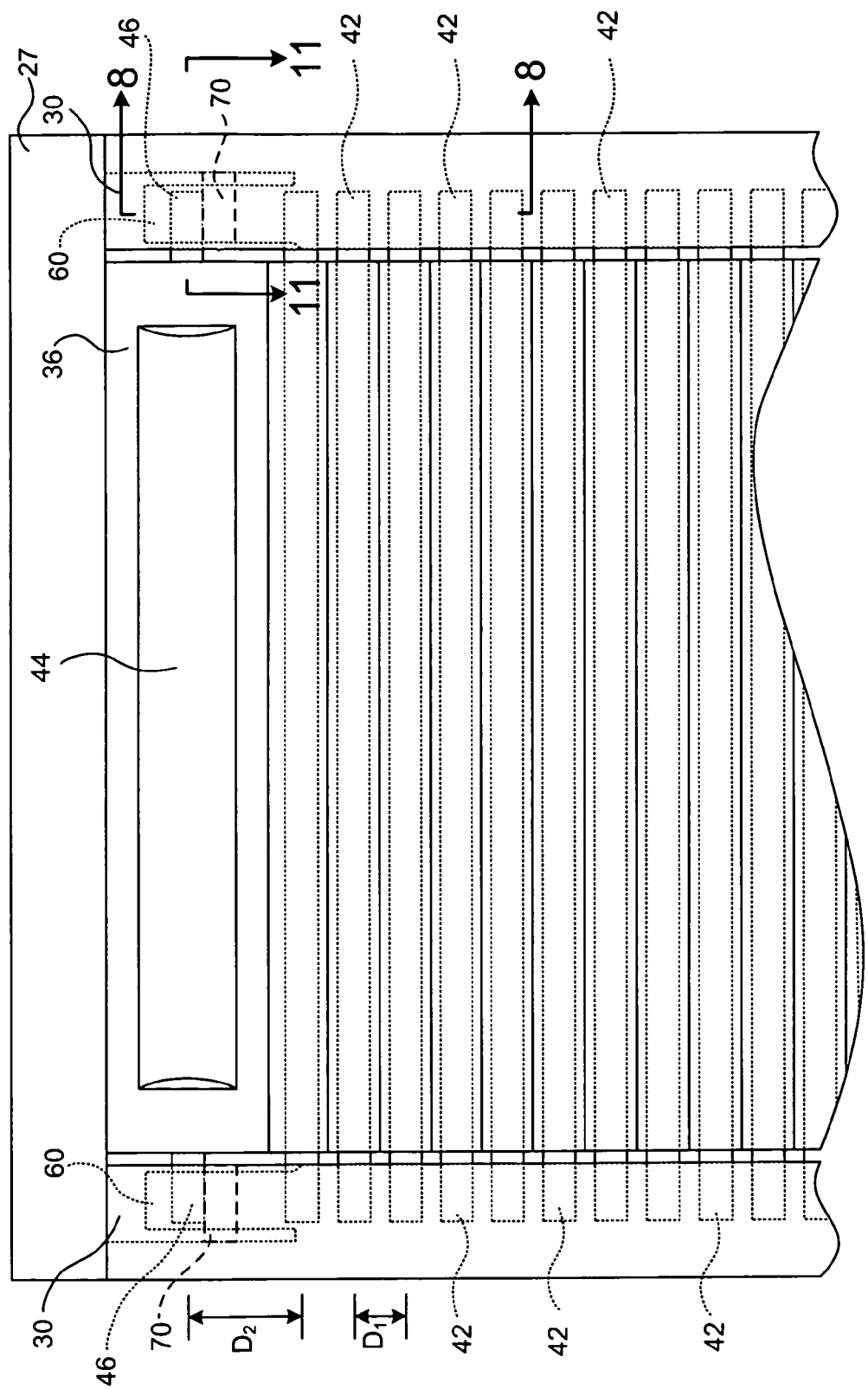
FIG. 7 is a top view of the storage structure showing details of a plurality of track engaging portions of the flexible lid and resiliently deformable lid detents of the tracks with the lid in a closed position in accordance with an embodiment of the present invention.

As shown in FIG. 5, the flexible lid 20 basically includes a flexible portion 32, a hand engagement portion 36 and a plurality of posts 42 and 46. The flexible portion 32 includes a plurality of rigid cross members with one of the plurality of posts 42 disposed at each opposite end of each rigid cross member. The posts 42 and 46 serve as track engaging portions and are configured to extend into the tracks 22 to allow selective sliding movement along the tracks 22 between the closed position (FIG. 3) and the open position (FIG. 4). Although the posts 42 and 46 are depicted with a cylindrical shape, the posts 42 can have any of a variety of shapes or profiles suitable for sliding along the length of the tracks 22. The flexible portion 32 also includes a plurality of living hinges to allow the flexible lid 20 to slide along both the straight and curved portions of the tracks 22, as described in greater detail below. The posts 42 are guide members disposed on lateral edges of the flexible lid 20 at approximately equally spaced apart intervals by a distance $D_1$, as shown in FIG. 7.

The flexible lid 20 is preferably installed in the tracks 22 such that the hand engagement portion 36 is located at an opening end of the lid 22. The hand engagement portion 36 includes a recess 44 that is dimensioned to accommodate a person's fingers or hand for opening and closing the flexible lid 20 in a manner described in greater detail below. The hand engagement portion 36 is a rigid member that includes the posts 46 at opposite lateral sides thereof. The posts 46 are generally the same as the posts 42 being track engagement portions, but also serve as retainable members in a manner explained in greater detail below. As shown in FIG. 7, the posts 46 are space apart from adjacent ones of the posts 42 by a distance $D_2$ that is greater than the distance $D_1$. As is explained in greater detail below, a central axis A extends through the posts 46, as indicated in FIG. 8.

It should be understood from the description and drawings that the flexible lid 20 can include any of a variety of configuration and is not limited to the configuration shown in the drawings. For example, a flexible lid formed of a single material or of multiple materials can be used with the present invention. Further, if the tracks 22 are straight, a rigid lid can be used in the present invention. Additionally, the flexible lid 20 of the present invention can also be a modification of a flexible lid disclosed in co-pending U.S. patent application Ser. No. 11/268,607, filed Nov. 8, 2005, entitled "Vehicle Storage Structure", which is incorporated herein by reference in its entirety. Specifically, the flexible lid disclosed in the co-pending application Ser. No. 11/268, 607 can be modified to include the hand engagement portion 36 and installed in the tracks 22 of the present invention.

Figure 6:
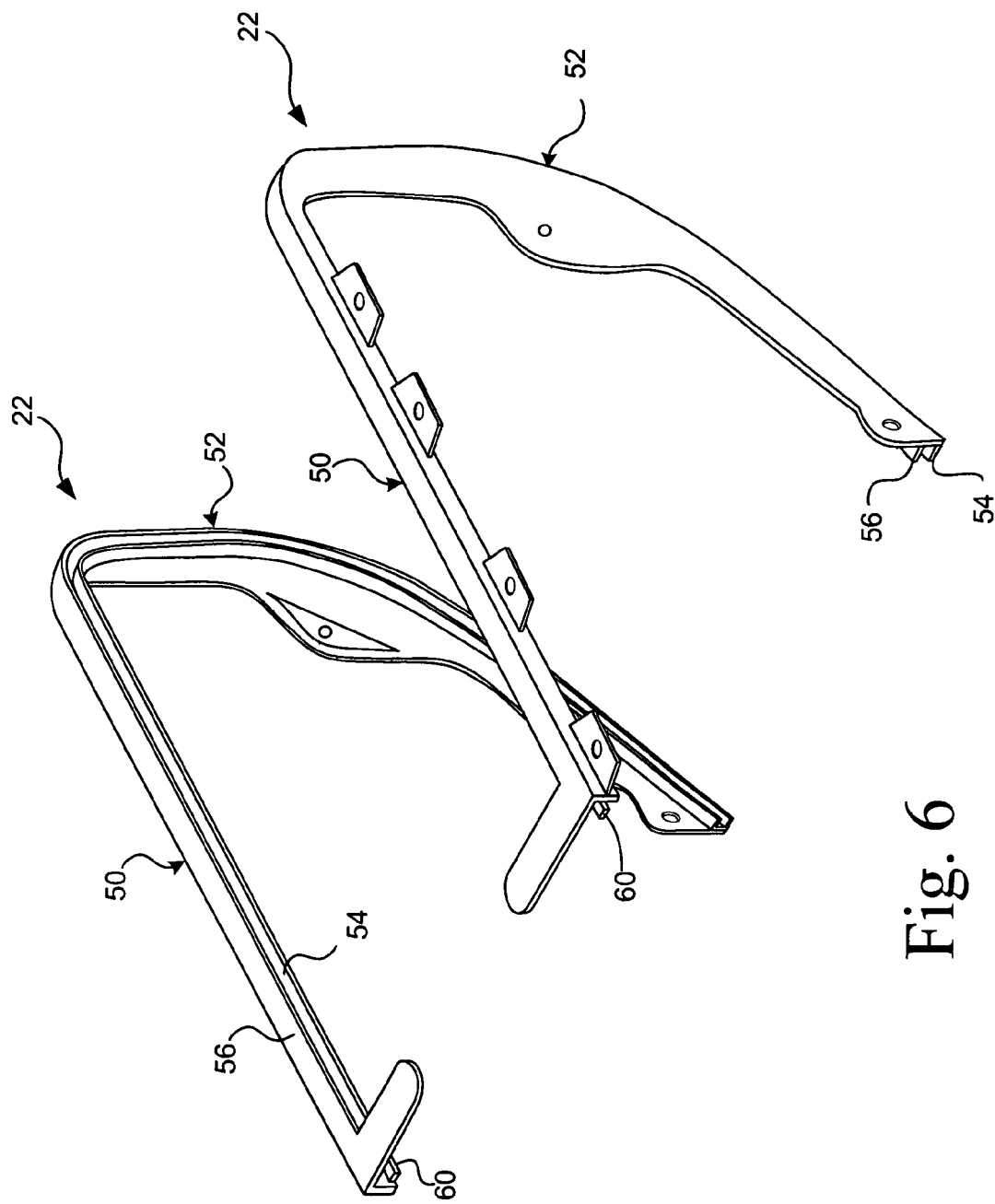
FIG. 6 is a perspective view of the tracks shown removed from the storage structure in accordance with an embodiment of the present invention.

Referring now to FIG. 6, the tracks 22 are described in greater detail. The tracks 22 are generally mirror images of one another and extend parallel to one another. Since description of one of the tracks 22 applies to both, description of only one of the tracks 22 is included for the sake of brevity. The tracks 22 are preferably formed of a molded thermoplastic material, such as acetal polyoxymethylene, polyformaldehyde, polyacetal compounds, or other similar materials. Each track 22 includes a generally straight section 50, an arcuate shaped section 52, a first track portion 54 and a second track portion 56. The first and second track portions 54 and 56 extend throughout the length of both the straight and arcuate shaped sections 50 and 52. The straight sections 50 of respective ones of the tracks 22 are disposed on opposite sides of the access opening 24 of storage structure 12 at least partially defining the access opening 24 (see FIG. 4).

The first and second track portions 54 and 56 confront one another being spaced apart from one another with respective ones of the posts 42 and 46 (track engaging portions) extending therebetween such that movement of the flexible lid 20 is restricted along a lid sliding path defined between the first and second track portions 54 and 56, as shown in FIG. 7.

The tracks 22 are dimensioned such that when installed on a respective one of the shell portions 26. The generally straight section 50 each of the tracks 22 extends along the track supporting surface 28 of the shell portion 26 of the respective one of the shell portions 26. The arcuate shaped section 52 extends around and conforms in shape to a curved back side of a respective one of the shell portions 26. The tracks 22 are installed on the shell portions 26 using fasteners (not shown) or bonded thereto via adhesives or both.

With specific reference to FIGS. 7-12, description is now provided of the first track portion 54. The first track portion 54 is formed with a resiliently deformable lid detent 60 that is configured and arranged to move between a lid latching orientation shown in FIGS. 8 and 11 and a lid releasing orientation shown in FIGS. 9 and 12. The resiliently deformable lid detent 60 includes a cantilevered portion of the first track portion 54. Specifically, the track 22, the resiliently deformable lid detent 60 and the first track portion 54 are unitarily formed as a single element or member with the resiliently deformable lid detent 60 extending from the first track portion 54. However, it should be understood from the drawings and the description that the resiliently deformable lid detent 60 can alternatively be a separate element fixed to either the track 22 or the shell portion 26.

The resiliently deformable lid detent 60 is dimensioned to extend in a cantilevered manner above the recess 30 formed in the shell portion 26. The resiliently deformable lid detent 60 is also an elongated member that extends longitudinally along the lid sliding path defined between the first and second track portions 54 and 56. While the resiliently deformable lid detent 60 is resilient and is designed to return to the lid latching orientation shown in FIGS. 8 and 11, an optional spring S is fitted within the recess 30 beneath the resiliently deformable lid detent 60 in order to ensure return of the resiliently deformable lid detent 60 to the lid latching orientation shown in FIGS. 8 and 11.

With specific reference again to FIGS. 7-12, description is now provided of the second track portion 56. The second track portion 56 includes a stop 70 disposed opposite to a respective one of the resiliently deformable lid detents 60. The stop 70 extends into the lid sliding path defined between the first and second track portion 54 and 56 in order to selectively contact the post 46. The stop 70 includes a latching surface 72 and an inclined ramping surface 74. The latching surface 72 is dimensioned and arranged to contact the post 46 such that a part of each of the resiliently deformable lid detents 60 must be deflected in a direction approximately normal to the movement of the flexible lid 20 by a deflection distance that is equal to or greater than one-half of a thickness of the post 46 to move the flexible lid 20 along the tracks 22 from the closed position to the open position.

The deflection distance is determined by the height of the latching surface 72. Specifically, the posts 42 and 46 have a thickness $H_1$ measured in a direction normal to the extending direction of the first and second track portions 54 and 56. The latching surface 72 (which corresponds to the height of the stop 70) has a height $H_2$ measured from the lower surface of the second track portion 56 to an edge 72a of the latching surface 72. As is shown in FIG. 9, the height $H_2$ is preferably at least half or greater than half of the thickness $H_1$. More specifically, the central axis A of the posts 46 is at least level with or above the edge 72a with the resiliently deformable lid detents 60 in the lid latching orientation shown in FIGS. 8 and 11.

The ramping surface 74 extends longitudinally along the second track portion 56 in a direction away from the latching surface 72. The stop 70 and the latching surface 74 are dimensioned and arranged to contact the post 46 (the retainable member) such that the resiliently deformable lid detents 60 must be deflected in a direction approximately normal to the movement of the flexible lid 20 by the deflection distance (the height $H_2$), which is equal to or greater than one-half of the thickness $H_1$ of the posts 46 (the retainable members) to move the flexible lid 20 along the tracks 22 from the closed position to the open position.

Figure 10:
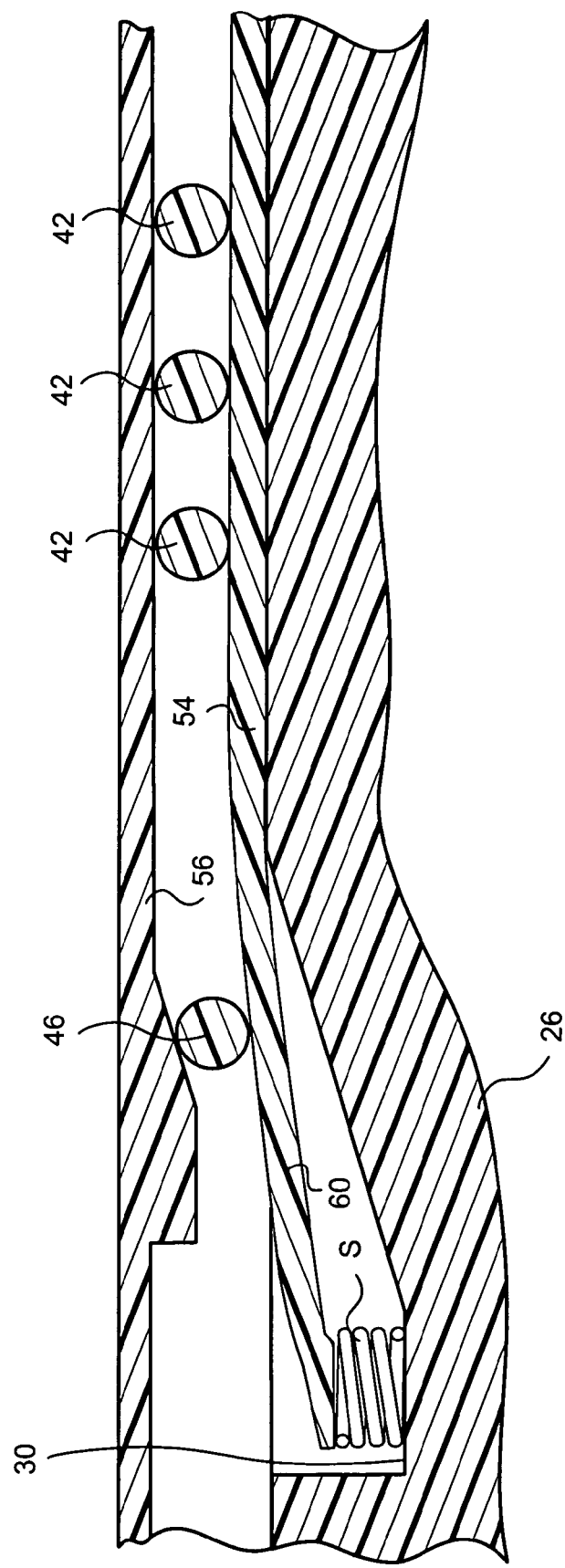
FIG. 10 is another cross-sectional view similar to FIGS. 8 and 9 showing the track engaging portions and one of the resiliently deformable lid detents with the lid moved toward the open position in accordance with an embodiment of the present invention.

Specifically, in order to open the flexible lid 20, the hand engagement portion 36 is pressed downward along with the posts 46 from a latched position shown in FIGS. 8 and 11 to an unlatched position shown in FIGS. 9 and 12. Downward movement of the posts 46 urges the resiliently deformable lid detents 60 from the lid latching orientation (FIGS. 8 and 11) to the lid releasing orientation (FIGS. 9 and 12). With the posts 46 and the resiliently deformable lid detents 60 in the lid releasing orientation, the post 46 and the flexible lid 20 are free to slide toward an open position (FIGS. 4 and 10).

Consequently, the posts 46 (the track engaging portions) and the deformable lid detents 60 are configured and arranged to normally restrict movement of the flexible lid 20 when in the closed position. The posts 46 are further configured and arranged to move the deformable lid detents 60 from the lid latching orientation to the lid releasing orientation in response to contact pressure being applied to hand engagement portion 36 of the flexible lid 60.

As is also indicated in FIG. 8, with the resiliently deformable lid detents 60 in the lid latching orientation, the upper surface of the resiliently deformable lid detents 60 and the upper surface of the first track portion 54 are generally co-planar. In other words, the resiliently deformable lid detents 60 and the spring S are configured such that the upper surface of the resiliently deformable lid detents 60 returns or is urged to an orientation where the upper surface of the resiliently deformable lid detents 60 is approximately aligned with the upper surface of the first track portion 54.

The posts 46 and the stops 70 are configured and arranged to maintain the flexible lid 20 in the closed position with the deformable lid detents 60 in the lid latching orientation in response to forces of at least 30 G's of acceleration applied in a direction approximately corresponding to the movement of the flexible lid. Further, the urging of the spring S on the deformable lid detents 60 ensures that the posts 46 remain in position against the latching surface 72 of the stop 70, further securing the flexible lid 20 in the closed position.

As used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies. The term G forces refers to the gravitational constant where 1 G is equal to $6.673 \times 10^{-11}$ Newtons·m²/kg².

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle storage structure comprising:
   a housing portion including a pair of generally parallel tracks at least partially defining an access opening with each of the tracks having a resiliently deformable lid detent that is configured and arranged to move between a lid latching orientation and a lid releasing orientation; and
   a lid including a pair of track engaging portions disposed on lateral edges of the lid and extending into respective ones of the tracks for selective sliding movement along the tracks between a closed position and an open position,
   the track engaging portions and the deformable lid detents being configured and arranged to normally restrict movement of the lid when in the closed position, the track engaging portions and the deformable lid detents being further configured and arranged to move the deformable lid detents from the lid latching orientation to the lid releasing orientation in response to contact pressure being applied to the lid in a direction approximately normal to the movement of the lid at an area adjacent to the deformable lid detents such that the lid is free to move along the tracks from the closed position to the open position.

2. The vehicle storage structure as set forth in claim 1, wherein
   each of the resiliently deformable lid detents includes a cantilevered portion of a respective one of the tracks.

3. The vehicle storage structure as set forth in claim 1, wherein
   each of the tracks includes confronting first and second track portions spaced apart from one another with respective ones of the track engaging portions extending therebetween such that movement of the lid is restricted along a lid sliding path defined between the first and second track portions.

4. The vehicle storage structure as set forth in claim 3, wherein
   the resiliently deformable lid detents are elongated members that extend longitudinally along the lid sliding path defined between the first and second track portions.

5. The vehicle storage structure as set forth in claim 4, wherein
   the resiliently deformable lid detents are unitarily formed with a respective one of the first and second track portions.

6. The vehicle storage structure as set forth in claim 5, wherein
   each of the resiliently deformable lid detents includes a cantilevered portion that is deflectable away from the lid sliding path defined between the first and second track portions.

7. The vehicle storage structure as set forth in claim 1, wherein
   each of the tracks includes a stop that is disposed opposite to a respective one of the resiliently deformable lid detents and extending into a lid sliding path of a respective one of the tracks to selectively contact one of the track engaging portions.

8. The vehicle storage structure as set forth in claim 7, wherein
   each of the stops includes a latching surface that is dimensioned and arranged to contact a respective one of the track engaging portions such that a part of each of the resiliently deformable lid detents must be deflected in a direction approximately normal to the movement of the lid by a deflection distance that is equal to or greater than one-half of a thickness of the track engaging portions to move the lid along the tracks from the closed position to the open position.

9. The vehicle storage structure as set forth in claim 8, wherein
   each of the stops includes an inclined ramping surface extending longitudinally along a respective one of the tracks in a direction away from the latching surfaces.

10. The vehicle storage structure as set forth in claim 7, wherein
    each of the stops includes an inclined ramping surface extending longitudinally along a respective one of the tracks in a direction away from the latching surfaces.

11. The vehicle storage structure as set forth in claim 7, wherein
    the stops and the track engaging portions are configured and arranged to maintain the lid in the closed position with the deformable lid detents in the lid latching orientation in response to forces of at least 30 G's of acceleration applied in a direction approximately corresponding to the movement of the lid.

12. The vehicle storage structure as set forth in claim 1, wherein
    each of the track engaging portions of the lid includes a plurality of guide members disposed on lateral edges of the lid at approximately equally spaced apart intervals, and a retainable member spaced farther distance from an adjacent one of the guide members than the intervals between the guide members.

13. The vehicle storage structure as set forth in claim 12, wherein
    the lid includes a plurality of rigid cross members with the guide members and the retainable member being disposed on opposite free ends of the rigid cross members.

14. The vehicle storage structure as set forth in claim 1, wherein
    each of the track engaging portions includes a laterally projecting retainable member that is selectively retained by one of the deformable lid detents to retain the lid in the closed position.

15. The vehicle storage structure as set forth in claim 14, wherein
    the retainable members are disposed at an opening end of the lid.

16. The vehicle storage structure as set forth in claim 14, wherein
    the retainable members are post shaped members.

17. The vehicle storage structure as set forth in claim 1, wherein
    the lid includes a hand engagement portion at an opening end of the lid, and the track engaging portions include retainable members disposed at lateral edges of the hand engagement portion of the lid.

18. The vehicle storage structure as set forth in claim 1, wherein
    the housing portion is a center console unit configured for installation between front passenger seats within a vehicle.

19. The vehicle storage structure as set forth in claim 14, wherein
each of the tracks includes a first track portion with one of the resiliently deformable lid detents and a second track portion with a stop disposed opposite to a respective one of the resiliently deformable lid detents.

20. The vehicle storage structure as set forth in claim 19, wherein
each of the stops includes a latching surface that is dimensioned and arranged to contact a respective one of the retainable members such that a part of each of the resiliently deformable lid detents must be deflected in a direction approximately normal to the movement of the lid by a deflection distance that is equal to or greater than one-half of a thickness of the retainable members to move the lid along the tracks from the closed position to the open position.

\* \* \* \* \*